United States Patent
Vig et al.

(10) Patent No.: US 10,482,102 B2
(45) Date of Patent: Nov. 19, 2019

(54) CONDITIONAL MASTER ELECTION IN DISTRIBUTED DATABASES

(71) Applicant: Amazon Technologies, Inc., Seattle, WA (US)

(72) Inventors: Akshat Vig, Seattle, WA (US); Timothy Andrew Rath, Des Moines, WA (US); Stuart Henry Seelye Marshall, Seattle, WA (US); Rande A. Blackman, Seattle, WA (US); David Alan Lutz, Renton, WA (US); Jian Wang, Bellevue, WA (US); Jiandan Zheng, Bellevue, WA (US); Janani Narayanan, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/431,706

(22) Filed: Feb. 13, 2017

(65) Prior Publication Data

US 2017/0154091 A1    Jun. 1, 2017

Related U.S. Application Data

(63) Continuation of application No. 14/023,165, filed on Sep. 10, 2013, now Pat. No. 9,569,513.

(51) Int. Cl.
*G06F 17/30* (2006.01)
*G06F 16/27* (2019.01)
(Continued)

(52) U.S. Cl.
CPC ......... *G06F 16/27* (2019.01); *G06F 16/2471* (2019.01); *G06F 16/24565* (2019.01); *G06F 16/28* (2019.01); *G06F 16/90* (2019.01)

(58) Field of Classification Search
CPC ......... G06F 17/30575; G06F 17/30587; G06F 17/30943; G06F 17/30578;
(Continued)

(56) References Cited

U.S. PATENT DOCUMENTS

| | | | |
|---|---|---|---|
| 5,434,994 A * | 7/1995 | Shaheen | G06F 12/0815 709/223 |
| 5,511,191 A | 4/1996 | de Leeuw van Weenen et al. | |

(Continued)

FOREIGN PATENT DOCUMENTS

WO    2003007552    1/2003

OTHER PUBLICATIONS

Amazon Simple DB Developer Guide API Version Apr. 14, 2009, pp. 1-100.

*Primary Examiner* — Daniel A Kuddus
(74) *Attorney, Agent, or Firm* — Robert C. Kowert; Meyertons, Hood, Kivlin, Kowert & Goetzel, P.C.

(57) ABSTRACT

Methods and apparatus for conditional master election in a distributed database are described. A plurality of replicas of a database object are stored by a distributed database service. Some types of operations corresponding to client requests directed at the database object are to be coordinated by a master replica. Client access to the database object is enabled prior to election of a master replica. In response to a triggering condition, a particular replica is elected master. The master coordinates implementation of operations with one or more other replicas in response to client requests.

20 Claims, 9 Drawing Sheets

(51) Int. Cl.
*G06F 16/28* (2019.01)
*G06F 16/90* (2019.01)
*G06F 16/2458* (2019.01)
*G06F 16/2455* (2019.01)

(58) Field of Classification Search
CPC ......... G06F 17/30581; G06F 17/30545; G06F 16/273; G06F 16/27; G06F 16/1844; G06F 16/178
See application file for complete search history.

(56) References Cited

U.S. PATENT DOCUMENTS

| | | | |
|---|---|---|---|
| 5,577,240 A | 11/1996 | Demers et al. | |
| 5,799,306 A | 8/1998 | Sun et al. | |
| 5,832,521 A | 11/1998 | Klots et al. | |
| 6,014,686 A * | 1/2000 | Elnozahy | G06F 9/465 709/202 |
| 6,061,740 A | 5/2000 | Ferguson et al. | |
| 6,178,441 B1 * | 1/2001 | Elnozahy | G06F 11/2097 709/201 |
| 6,889,338 B2 | 5/2005 | Srinivasan et al. | |
| 6,950,833 B2 | 9/2005 | Costello et al. | |
| 7,107,419 B1 | 9/2006 | Ghemawat et al. | |
| 7,392,421 B1 | 6/2008 | Bloomstein et al. | |
| 7,675,869 B1 | 3/2010 | Anker et al. | |
| 7,783,786 B1 * | 8/2010 | Lauterbach | H04L 67/1095 709/238 |
| 7,801,861 B2 | 9/2010 | Wong et al. | |
| 8,145,726 B1 | 3/2012 | Roche et al. | |
| 8,375,001 B2 | 2/2013 | San Martin et al. | |
| 8,572,031 B2 * | 10/2013 | Merriman | G06F 11/1458 707/613 |
| 8,627,135 B2 * | 1/2014 | Aron | G06F 11/2028 714/4.1 |
| 8,719,225 B1 * | 5/2014 | Rath | G06F 16/27 707/634 |
| 8,874,726 B1 | 10/2014 | Dugganapally et al. | |
| 9,569,513 B1 | 2/2017 | Vig et al. | |
| 2002/0194015 A1 * | 12/2002 | Gordon | G06F 16/273 705/1.1 |
| 2003/0037283 A1 * | 2/2003 | Srinivasan | H04L 1/22 714/11 |
| 2003/0088659 A1 | 5/2003 | Susarla et al. | |
| 2006/0149799 A1 * | 7/2006 | Wong | G06F 16/27 |
| 2006/0155789 A1 * | 7/2006 | Wong | G06F 16/27 |
| 2007/0083528 A1 * | 4/2007 | Matthews | H04L 41/0806 |
| 2010/0185719 A1 * | 7/2010 | Howard | G06F 8/45 709/201 |
| 2011/0188506 A1 * | 8/2011 | Arribas | H04L 67/1095 370/400 |
| 2012/0166390 A1 * | 6/2012 | Merriman | G06F 11/1458 707/613 |
| 2012/0254412 A1 * | 10/2012 | Goose | G06F 9/5072 709/224 |
| 2012/0260120 A1 | 10/2012 | Mongeau et al. | |
| 2012/0265742 A1 | 10/2012 | Burckhardt et al. | |
| 2012/0303576 A1 | 11/2012 | Calder et al. | |
| 2013/0304694 A1 | 11/2013 | Barreto et al. | |
| 2014/0081473 A1 * | 3/2014 | Bengtson | G05B 9/02 700/287 |
| 2014/0324785 A1 | 10/2014 | Gupta et al. | |
| 2014/0379506 A1 | 12/2014 | Marshall et al. | |
| 2016/0166390 A1 * | 6/2016 | Dye | A61F 2/3609 623/23.42 |

* cited by examiner

CONDITIONAL MASTER ELECTION IN DISTRIBUTED DATABASES

This application is a continuation of U.S. patent application Ser. No. 14/023,165, filed Sep. 10, 2013, now U.S. Pat. No. 9,569,513, which is hereby incorporated by reference herein in its entirety.

BACKGROUND

Several leading technology organizations are investing in building technologies that sell "software-as-a-service". Such services provide access to shared storage (e.g., database systems) and/or computing resources to clients or subscribers. Within multi-tier e-commerce systems, combinations of different types of resources may be allocated to subscribers and/or their applications, such as whole physical or virtual machines, CPUs, memory, network bandwidth, or I/O capacity.

One of the many benefits of using the software-as-a-service approach is that providing the desired levels of availability, data durability and scalability becomes the responsibility of the service operator. Clients of the services may simply decide what levels of availability, durability and performance they wish to pay for, and leave the implementation details to the services. The service operators may consequently establish numerous data centers, often geographically distributed across different cities, states, or even countries, and populate the data centers with computing, networking, and storage infrastructure based on expectations of client usage levels for the various services. The specific resources used for a given client may be selected from several different data centers, for example, to achieve desired levels of fault tolerance and data durability.

In at least some scenarios, internal services may be set up to manage some of the common components of functionality underlying various client-accessible services. For example, a large provider may implement a number of different database-related services, (e.g., relational database management services, object-oriented database services, NoSQL or non-relational databases, and the like, each targeted to different market segments) several of which may require state management for database objects such as tables or table partitions. A general-purpose state management service may be implemented for internal use within the provider's network, for use by each of the different database-related services. Such a state management service may also be used for managing states of resources used by other types of services, such as virtualized computing services, where for example health state transitions and overall responsiveness of various virtualization hosts and/or compute instances may need to be monitored.

The use of such internal state management services may reduce the need for different client-accessible services to re-implement similar pieces of underlying technology, thereby helping reduce costs for the service provider. However, at least under some circumstances, e.g., especially during periods of recovery from infrastructure outages, when a large number of state transitions may have to be handled within a short time period, it may be possible for the state management service itself to become overloaded, which can potentially lead to cascading problems for the client-accessible services.

Figure 1:
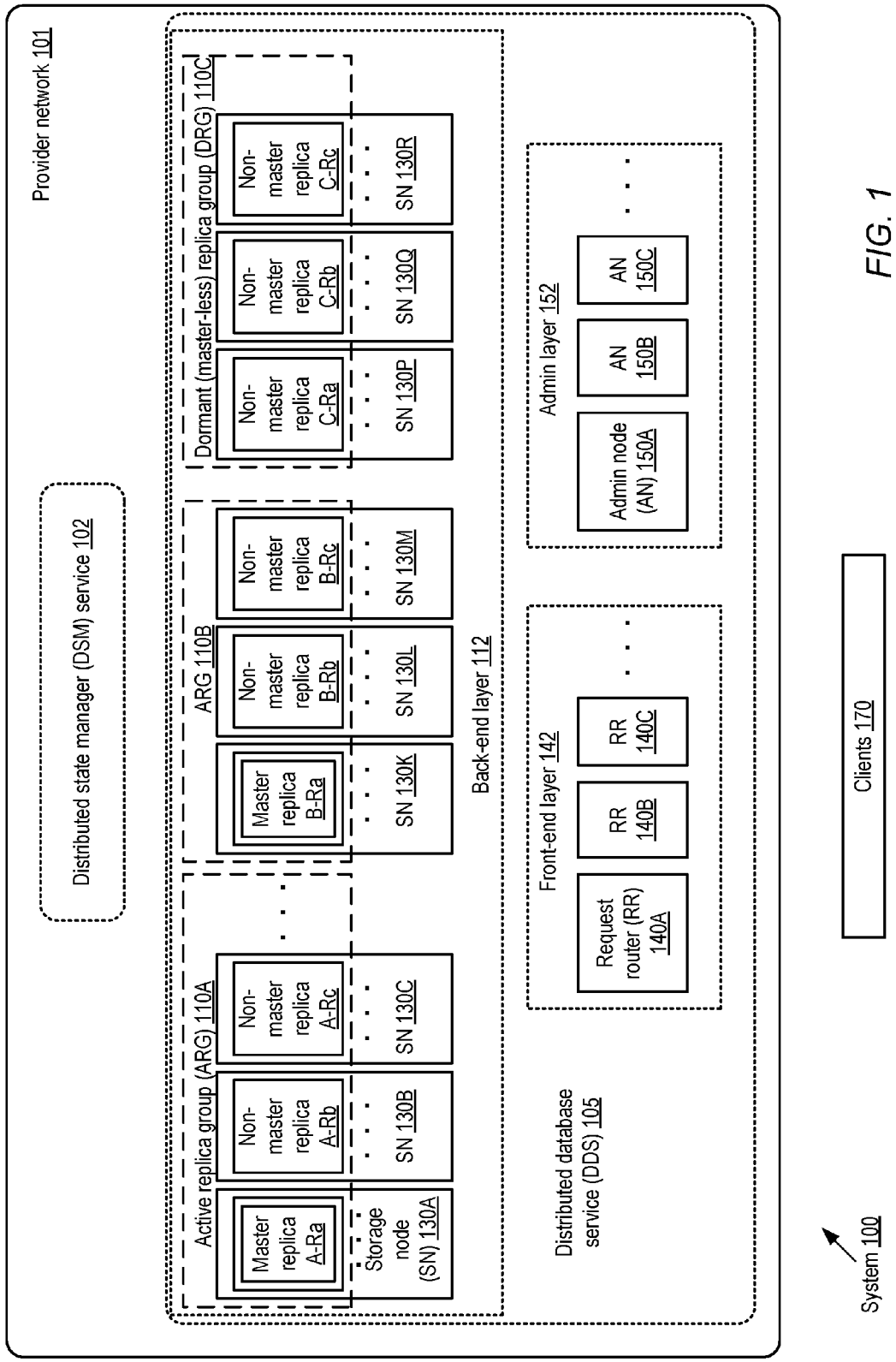
FIG. 1 illustrates an example of a system in which conditional election of master replicas of database objects is supported at a distributed database service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for conditional master election in distributed databases are described. According to some embodiments, a distributed database service may be set up in a provider network, in which various types of database objects such as tables or table partitions are replicated. Different replicas of a replica group for a given object may be assigned different roles with respect to the way in which writes are propagated and/or the manner in which a desired level of consistency for the data is attained. As described below in further detail, in some embodiments, one replica of a replica group may be elected a "master" replica in response to a determination that a triggering condition has been met, and that master replica may subsequently coordinate the implementation of one or more types of operations with the remaining replicas. Various aspects of the techniques used for master election (e.g., the selection of the triggering conditions) may be designed in such a way as to minimize the overall overhead associated with state management for the distributed database service as a whole, e.g., by avoiding at least some master elections until they become necessary, or until the estimated probability that a master election will be required within a short time reaches a threshold.

Networks set up by an entity such as a company or a public sector organization to provide one or more network-accessible services (such as various types of cloud-based database, computing or storage services) accessible via the Internet and/or other networks to a distributed set of clients may be termed provider networks herein. In the remainder of this document, the term "client", when used as the source or destination of a given communication, may refer to any of the computing devices, processes, hardware modules or software modules that are owned by, managed by, or allocated to, an entity (such as an organization, a group with multiple users or a single user) that is capable of accessing and utilizing at least one network-accessible service of the provider network. A given provider network may include numerous data centers (which may be distributed across different geographical regions) hosting various resource pools, such as collections of physical and/or virtualized computer servers, storage servers with one or more storage devices each, networking equipment and the like, needed to implement, configure and distribute the infrastructure and services offered by the provider. A number of different hardware and/or software components, some of which may be instantiated or executed at different data centers or in different geographical regions, may collectively be used to implement each of the services in various embodiments.

A distributed database service (DDS) may be offered by a provider network in some embodiments, enabling clients to use the provider network's compute and storage capabilities to implement database applications over network connections, e.g., using one or more programmatic interfaces such as a web-services interface. For example, using such a programmatic interface, a client of the distributed database service may issue a respective request to create a table, to insert data into a table, to read data from a table, and so on. The distributed database service may be implemented using several logical layers or groups of resources of the provider network in some embodiments, including for example a front-end layer comprising nodes used for receiving and responding to client requests, a back-end layer comprising storage nodes at which the data is stored, and/or an administrative layer from which resources of other layers are managed. In at least some such embodiments, direct accesses from the clients may not be permitted to the back-end layer. The distributed database service may implement any of various types of database technologies and models in different embodiments, such as a relational database, an object-oriented database, a key-value based non-relational (e.g., a "NoSQL") database, a document-oriented database, and so on.

According to one embodiment, the DDS may support a high level of data durability and/or availability for at least some database objects (e.g., tables) using object-level replication. In one example implementation, N replicas R1, R2, . . . RN of the data of a given table T may be stored, in respective availability containers of the provider network (where N may be selectable by the DDS, e.g., in response to clients' durability or availability requirements). The set of replicas of a given table may be termed a "replica group" herein. A given availability container may comprise a portion or all of one or more data centers, and may be engineered in such a way as to prevent various types of failures within a given availability container from impacting operations at other availability containers. Thus, for example, a given availability container AC1 may comprise a set of hardware, software and infrastructure components (such as power supplies, power distribution units, cooling/heating equipment, networking equipment and the like) that has a failure profile (e.g., a probability distribution over time of various types of faults or errors) that is not expected to be correlated with the failure profile of a different availability container AC2. Each availability container may itself be designed to have very low failure rates, along with the isolation characteristics that prevent cascading faults across multiple availability containers. The implementation of numerous availability containers capable of containing failures within their boundaries may thus help support highly reliable and durable services. Thus, in the case where N replicas of T are stored in respective availability containers, T's data would remain accessible even if N−1 availability containers happen to become unavailable at once, reducing the probability of a complete outage to very near zero. Availability containers may also be referred to as "availability zones" in some implementations. In at least some embodiments, the resources of a geographically distributed provider network may be organized into a hierarchy of geographical regions, with each region comprising some number of availability containers, and each availability container comprising part or all of one or more data centers.

The DDS may support various data consistency models in different embodiments. For example, according to one consistency model, a write or update to a given table may have to be persisted at a quorum number of replicas before the write is deemed complete, while a read may be performed at any of the replicas (and as a result, it may be the case that a given read request may return a slightly out-of-date version of the data, if for example a recent update has not been propagated to the replica from which the read is satisfied). In some embodiments, two or more categories of reads may be supported: "consistent reads" versus "eventually-consistent reads", for example. A consistent read directed at a given table or object may return a result that reflects all the writes that completed successfully prior to the read request in such an embodiment, while an eventually consistent read may not necessarily reflect the result of a recently completed write for a short time period (e.g., typically on the order of a second or less in some implementations).

Different approaches to update propagation may be taken in different implementations of the DDS. In one embodiment, one of the replicas of the table's replica group may be elected to a "master" role, using any of various techniques described below. The DDS may support various types of client work requests (e.g., different types of requests to view and/or modify client data or metadata) in different embodiments. A given client work request may require one or more operations (e.g., reads or writes) at the back-end storage nodes. When a client work request (e.g., a client-submitted update or insert command) that involves a write is received, e.g., at a front-end node of the DDS, a corresponding write operation may first be performed at the master, and the master may then coordinate the propagation of the write to the other replicas of the replica group. Such coordination may involve, for example, directing write propagation operations to one or more non-master replicas, and waiting for acknowledgements from a sufficient number of non-master replicas before determining that the write has been successfully completed. Consistent read operations may also be directed to and coordinated by the master in at least some embodiments, as the master is the replica that is aware of the state of the most recent write directed to the target of the consistent read. In response to a consistent read request, the master may, in some cases, have to wait for a short period of time until the most recent write completes (i.e., until one or more acknowledgement of outstanding write propagations are received from non-master replicas). In other cases, if the latest write to the targeted data has been acknowledged from some number of non-master replicas, the master may not have to wait in response to a request for a consistent read. Eventually-consistent reads may be handled by any of the replicas in some embodiments, e.g., by sending a read request to the nearest replica from the front-end node that receives the client request. Thus, in at least some embodiments, one or more types of operations corresponding to client work requests directed at database objects may have to be coordinated by a master replica, while other types of operations may not need such coordination. In some embodiments, more than one master may be elected for a given replica group—e.g., one master for handling writes and a different master for handling consistent reads—using conditional election techniques similar to those described herein.

In at least one embodiment, a distributed state management service (SMS), which may also be referred to herein as a distributed state manager (DSM), implemented within the provider network, may be used for master election. The DSM may be used by one or more other services of the provider network in at least some embodiments, and not just by the DDS. Even the DDS may use the DSM not just for master election, but also for other types of state management operations in some embodiments, such as ensuring via heartbeat monitoring that the various nodes of the DDS layers remain responsive. In some implementations, the DSM itself may comprise a plurality of nodes or clusters of nodes, distributed across different availability containers and/or data centers. Especially in large provider networks in which numerous other services use the DSM, the resource utilization levels of the DSM itself may reach high levels, especially after events such as large-scale outages (e.g., when power outages or weather emergencies result in hundreds or thousands of provider network resources becoming unavailable or inaccessible at the same time, followed by a period of recovery in which the resources all come on-line). Consider a scenario in which a given DSM node is configured to receive and respond to heartbeat requests from thousands of resources in accordance with a health monitoring protocol, as well as to handle master election requests from some number of those same resources. If the DSM node becomes overwhelmed with handling master election requests during an especially busy period (e.g., during recovery from an outage), it may not be able to respond to heartbeat messages from some set of resources quickly enough. This in turn may lead the resources that do not receive heartbeat responses quickly enough to determine that their network links to the DSM node have been compromised or have failed, and such resources may in turn transmit heartbeats to other DSM nodes, which may also be overloaded, and may also not respond quickly enough. As a result, a positive feedback loop may be established, as a result of which more and more workload is generated for already-overloaded DSM nodes.

Techniques for conditional master election may accordingly be implemented in some embodiments, e.g., to reduce the workload associated with the elections of master replicas (or at least to spread election-related workload more evenly over time). According to one such technique, a replica group for a given database object may be deemed to be in one of several states with respect to master election at any given point in time. In on embodiment, a replica group may be in an active state if it currently has a master elected, and in a dormant or master-less state if none of the replicas is currently designated as the master. For example, when a replica group is created, e.g., in response to a "create table" request from a client, the replica group may be initially configured in master-less or dormant state in some embodiments, and client access may be enabled to the table prior to the election of the master. In response to receiving a client work request directed at the table, which does not require coordination by a master replica (such as an eventually-consistent read), operations corresponding to the work request may be implemented at a selected replica of the replica group, such as a particular randomly-selected replica or a replica selected based on locality or low latency.

If a determination is made by the DDS that a triggering condition for master election at a master-less replica group has been met, the process of master election may be initiated in such an embodiment. A number of different conditions may trigger master election, such as for example a client's submission of a write request or a consistent read request (either of which may require coordination by a master), or a determination by an administrative node of the DDS that coordination-requiring operations directed at the table are likely to commence in the near future. According to some implementations, a quorum-based master election protocol may be implemented, in which one replica Rj initially sends a request for a token or a lock to a DSM. If the DSM grants the token/lock to the requesting replica Rj, Rj (or the DSM itself) may notify the other replicas of the replica group that Rj is a candidate for the master role, and is awaiting acknowledgement of its election as master. If a quorum of the remaining replicas transmit acknowledgement messages to Rj (and/or to the DSM) indicating their approval of Rj being elected master, the election process may be deemed complete in some embodiments. Subsequently, in response to work requests that require coordination, the master replica Rj may coordinate the implementation of the corresponding work operations. If Rj is not elected master (e.g., if the DSM does not grant the token to Rj, or a sufficient number of acknowledgments is not received), a different replica may eventually be elected (or Rj itself may be elected after retrying for the master role). In some implementations, more than one replica may attempt to become master in response to the triggering condition, and one of the attempting replicas may be selected by the DSM. In at least one embodiment, the master election process may not involve the use of a quorum-based protocol—e.g., a particular replica may be selected as master without requiring the assent of other replicas.

In some embodiments, any of several conditions or scenarios may lead to a given active replica group (i.e., one that currently has an elected master replica) becoming dormant or master-less. For example, in one embodiment, if the current master replica fails (or its master status is revoked due to failure to respond quickly enough to heartbeat messages, due to network partitioning, or due to some other reason), the election of a new master may be deferred until one of the triggering conditions is met, leaving the replica group dormant for some period of time. In some embodiments, the DDS may monitor the number of work requests directed at the replica group that do require master-led coordination, and if the number of such requests within a given time period falls below a threshold, the replica group may be moved to the dormant state by revoking the master's status.

Example System Environment

FIG. 1 illustrates an example of a system 100 in which conditional election of master replicas of database objects is supported at a distributed database service 105, according to at least some embodiments. As shown, system 100 includes a provider network 101 in which a number of network-accessible services including the DDS 105 may be implemented. Some of the services, such as DDS 105, may be exposed (e.g., via various programmatic interfaces such as application programming interfaces, web pages, command-line tools, graphical user interfaces and the like) to clients 170 outside the provider network (e.g., programs running on hosts located within client networks or client-owned data centers). Other services, such as a distributed state manager (DSM) 102, may be used primarily by other services such as the DDS 105, and may not necessarily be exposed directly to external clients.

The DDS 105 in the depicted embodiment may comprise several layers of resources. A front-end layer 142, comprising one or more request router (RR) nodes 140 (such as RRs 140A, 140B, and 140C) may serve as the service endpoints to which clients 170 submit work requests (e.g., read and write requests of various types) directed to database objects, and from which clients may receive responses to the work requests. Database objects such as tables, indexes and the like may be stored in back-end layer 112 of the DDS, which comprises a plurality of storage nodes 130, such as storage nodes 130A, 130B, 130C, 130K, 130, 130M, 130P, 130Q and 130R. To provide desired levels of availability, durability and/or performance, tables and/or other database objects may be replicated at the back-end layer 112 in the depicted embodiment. A number of replicas of a given table, for example, may each be stored at a respective storage node 130. The set of replicas of a given object such as a table may be referred to as a replica group (RG) 110. At a given point in time, an RG may be in an active state, in which case it currently has an elected master replica, or in a dormant or master-less state in the depicted embodiment. (Other states, such as short-lived states during the implementation of a master election protocol may also be supported in at least some embodiments.)

Three example replica groups are shown in FIG. 1: active replica groups (ARGs) 110A and 110B, and dormant replica group (DRG) 110C. ARG 110A includes a master replica A-Ra of a database object, stored at storage node 130A, as well as two non-master replicas A-Rb and A-Rc stored respectively at storage nodes 130B and 130C. Similarly, ARG 110B comprises master replica B-Ra at storage node 130K, and non-master replicas B-Rb and B-Rc at storage nodes 130L and 130M. DRG 110C comprises three non-master replicas C-Ra, C-Rb and C-Rc at storage nodes 130P, 130Q and 130R. It is noted that although availability container boundaries and data center boundaries are not shown in FIG. 1, in at least some implementations each of the replicas of an RG 110 may be stored in a different availability container or data center than the others. The RRs 140 and/or nodes 152 of administrative layer 150 may also be distributed across different data centers and availability containers in at least some embodiments. Although only a single replica is shown at a given storage node 130 in FIG. 1, each storage node may comprise a plurality of replicas (typically belonging to different RGs). The number of replicas in different RGs may differ in some embodiments—e.g., depending on clients' data durability and/or availability needs, some database objects may have more replicas set up than others.

A number of administrative nodes 150, such as nodes 150A, 150B and 150C, may collectively form an administrative layer 152 of the DDS 105 in the depicted embodiment. Admin nodes 150 may be responsible for such tasks as maintaining the mappings between database objects and the storage nodes at which the objects' replicas are located, acquiring and releasing resources for the storage nodes and RRs as needed, and so on. In at least some embodiments, as described below in further detail, when a client work request directed to a particular database object is first received at an RR 140, the RR 140 may determine which specific storage node or nodes are to be contacted by querying an admin node 150. A cache of object-to-SN mappings may be maintained at an RR 140 in at least some embodiments.

Master election may be accomplished with the help of the DSM 102 in the depicted embodiment. In other embodiments, other state management machinery may be used, such as a distributed or centralized state manager implemented within the DDS 105 itself. In some embodiments, when an RG is first created, e.g., in response to a request from a client 170 to create a table in the DDS, a replica group with some number of replicas may be created at selected storage nodes 130 in dormant or master-less state. In other embodiments, a master node may be elected by default immediately upon, or shortly after, RG creation, e.g., with the help of the DSM 102.

RG state transitions from dormant state to active state, and from active state to dormant state, may be initiated by a number of types of triggering conditions in different embodiments. For example, in order to respond to a client work request that includes a write operation, in some embodiments coordination by a master replica may be required. Accordingly, the arrival of a coordination-requiring work request at an RR 140 may itself serve as a trigger for master election, if the targeted database object's replica group happens to be in master-less state at the time the work request is received. In at least some embodiments, an admin node 150 or an RR 140 may proactively initiate the master election process, e.g., in response to a determination that coordination-requiring operations are likely to commence within some time window. For example, the timing of changes in some application workloads may be at least somewhat predictable, based on monitored metrics and/or based on client input. If an admin node or an RR determines that the probability that write (or consistent read) operations directed to a currently dormant RG are going to be received within the next hour, master election may be triggered in some embodiments.

Conversely, in at least some embodiments, if an admin node or an RR is able to determined that the rate of work requests requiring master-led coordination at a given RG has fallen below a threshold level for some time interval, this may lead to an inference that the corresponding database object is not likely to require master-led coordination anytime in the near future. Accordingly, if the RG is currently active but there is a low estimated probability of master-led coordination being needed, the master status of the current master replica may be revoked, and the RG may be placed in dormant state at least temporarily in some implementations.

In at least some embodiments, the DSM 102 may be responsible for tracking the health status of the storage nodes 130 and/or of tracking the individual health states of specific replicas stored on the storage nodes 130, e.g., using a heartbeat message exchange protocol. If the DSM 102 determines that the master replica of an ARG is not responsive, or cannot be contacted via the network, the DSM 102 may also revoke the master status of the replica, and in some cases the corresponding RG may be left for at least some time without a master. In some scenarios, a master replica may itself voluntarily give up its master role (e.g., if abnormal conditions or overload is detected at the storage node at which the master is resident). Thus, master elections as well as master status revocations may in general be initiated due to a number of different reasons, and by a number of different sources, in various embodiments.

In at least some embodiments, clients may be enabled to access to a given database object (e.g., by being provided with a logical identifier or name for the object, which can be used to direct work requests to the object) even if none of the corresponding replicas has been elected master. Depending on the types of operations the client wishes to perform, a given client work request may either be satisfied without electing a master (e.g., an eventually-consistent read may be performed at any non-master replica), or the response to the given client request may have to wait until master election is completed (e.g., in the case of a write or a consistent read). The master election process itself may comprise several (possibly asynchronous) steps in different embodiments, and the order in which the various steps are completed may in some cases be unpredictable because of the distributed nature of the entities involved. In one embodiment the master election process may begin by a particular replica (such as a replica targeted by an RR to respond to a client's work request) requesting a token or lock from the DSM 102. If the token/lock is granted, the remaining replicas, or some number of remaining replicas, may be informed that the token has been granted to the particular replica. The particular replica may then have to wait for acknowledgements from at least some of the other replicas, before it and the DSM consider master election completed. After the master has been elected, the master may coordinate work operations for those work requests that require it, such as for writes or consistent reads. In some embodiments, each replica of a given replica group may be configured to submit its own request for the token or lock whenever it discovers that another replica has submitted a similar request, thus allowing the DSM greater flexibility in the selection of the next master, as described below in further detail with reference to FIG. 3. Such an approach may help reduce the average time taken to elect a master, for example, since the DSM may become aware of all the candidates for master fairly quickly.

By letting at least some replica groups remain master-less for some periods of time, especially during recovery following a failure event, the workload imposed on the DSM 102 may be substantially reduced and/or smoothed over time, compared to the alternative of always immediately electing masters as soon as possible. Such an approach may thus reduce the likelihood of the DSM 102 becoming overloaded. This, in turn, may help the services relying on the DSM from encountering problematic scenarios such as positive feedback loops involving missed heartbeat responses followed by repeated new heartbeat messages which in turn lead to further missed heartbeat responses, and so on.

Work Request Types

Figure 2A:
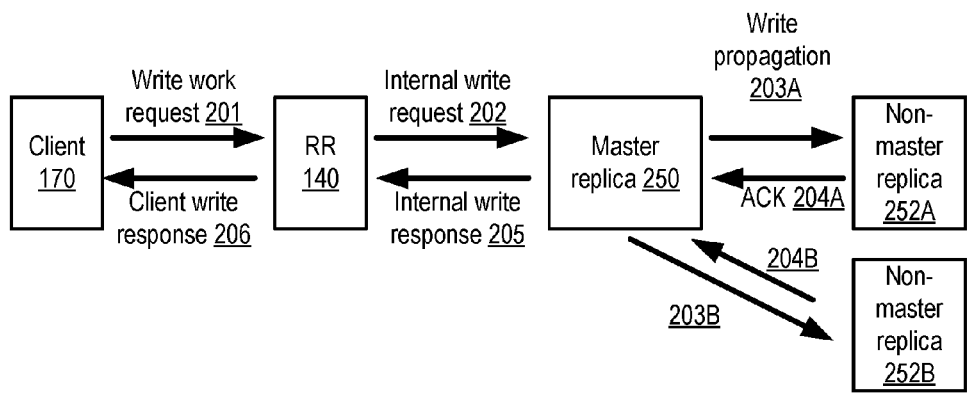
FIGS. 2a, 2b and 2c respectively illustrate high level overviews of write operations, consistent read operations, and eventually-consistent read operations at a distributed database implementing multiple replicas of objects, according to at least some embodiments.
Figure 2B:
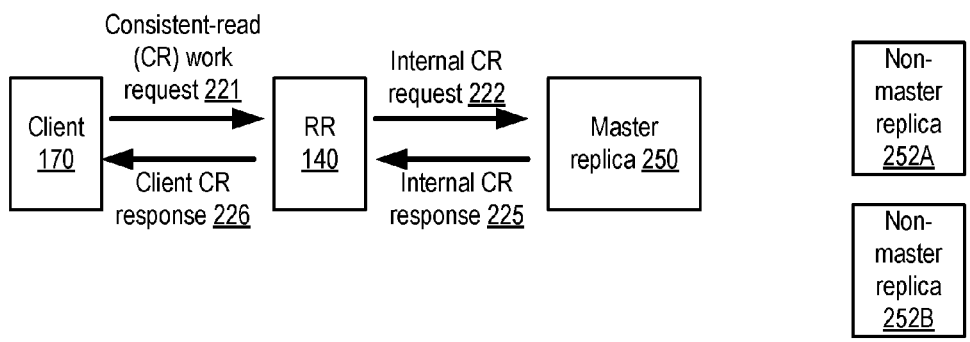
Figure 2C:
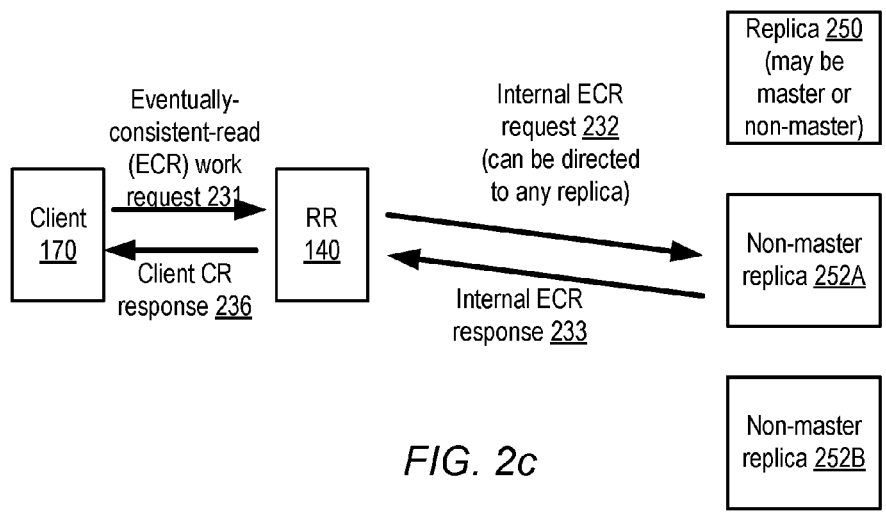

As noted earlier, in at least some embodiments, a number of different client work request types may be supported by the DDS 105, some of which may require coordination by a master replica, while others may not. FIGS. 2a, 2b and 2c respectively illustrate high level overviews of write operations, consistent read operations, and eventually-consistent read operations at a distributed database implementing multiple replicas of objects, according to at least some embodiments. FIG. 2a shows a client's write work request 201 (e.g., an insert, update, create, or modify operation directed to a table or to table metadata) being submitted by a client 170 to an RR 140. The RR 140 in turn submits an internal representation of a write request 202 to the master replica 250 of the replica group of the targeted data object. In cases in which there is no master at the time the write request is received, master election may have to be completed before the write operation can actually be performed at any of the replicas. The master replica 150 may implement the write operation locally, and then propagate the writes to one or more non-master replicas 252A and 252B, as indicated by arrows 203A and 203B. The master may wait for one or more acknowledgements 204 (e.g., 204A and/or 204B) before an internal write response 205 indicating write completion at the back-end is sent to the RR 140. In turn, after receiving the internal write response 205, the RR 140 may transmit a client write response 206 to the client 170. The number of non-master replicas from which acknowledgements are required before a write is considered successful may vary in different implementations. In some implementations, no such acknowledgements may be required, as long as the local write at the master replica has been completed successfully.

In FIG. 2b, a client 170 sends a consistent read (CR) work request 221 to an RR 140. The CR work request may be directed to a table, or to metadata about the table (which may also be replicated together with the data), for example. The RR 140 once again identifies the master replica 250 of the RG of the targeted data object (which may in some cases require a master election) which is to respond to the corresponding internal CR request 222. The master 250 verifies that the latest write directed to the data object has been successfully acknowledged by at least some of the non-master replicas (which may or may not require any waiting by the master, depending on how recently the latest write was propagated), and sends an internal CR response 225 comprising the requested data back to the RR 140. The RR in turn may send a client CR response 226 back to the requesting client.

FIG. 2c shows operations corresponding to an eventually-consistent read (ECR) work request 231 submitted by a client 170 to an RR 140. In this case, master-led coordination may not be required in the depicted embodiment. The RR 140 may simply choose one of the replicas (e.g., any of the non-master replicas or the master replica itself, if a master has been elected), using some set of rules or heuristics. For example, as shown, the RR 140 may submit an internal ECR request to non-master replica 252A, which may have been selected at random, using an LRU (least-recently-used) heuristic, using a load balancing technique, or using some other approach. The selected replica may read the requested data from its local copy (which need not necessarily have the very latest update to the requested data), and transmit an internal ECR response 233 back to the RR 140. The RR 140 may in turn transmit a client ECR response to client 170. It is noted that a master need have been designated for the replica group in order to respond to ECR requests in at least some embodiments; thus, replica 250 may or may not be a master at the time the read operation for the ECR request is implemented.

Various other types of work requests, in addition to or instead of the illustrated combination of writes, consistent reads, and eventually-consistent reads may be implemented in different embodiments. In some embodiments, only writes and consistent reads may be supported, while in other embodiments, only writes and eventually-consistent reads may be supported. In some embodiments, different consistency levels may be supported for writes as well as reads—e.g., in an embodiment in which N replicas are maintained for a given object, writes that are considered complete when they have been successfully propagated to 1, K, L and N replicas may be supported, where $1<K<L<N$.

Master Election Message Flow Example

Figure 3:
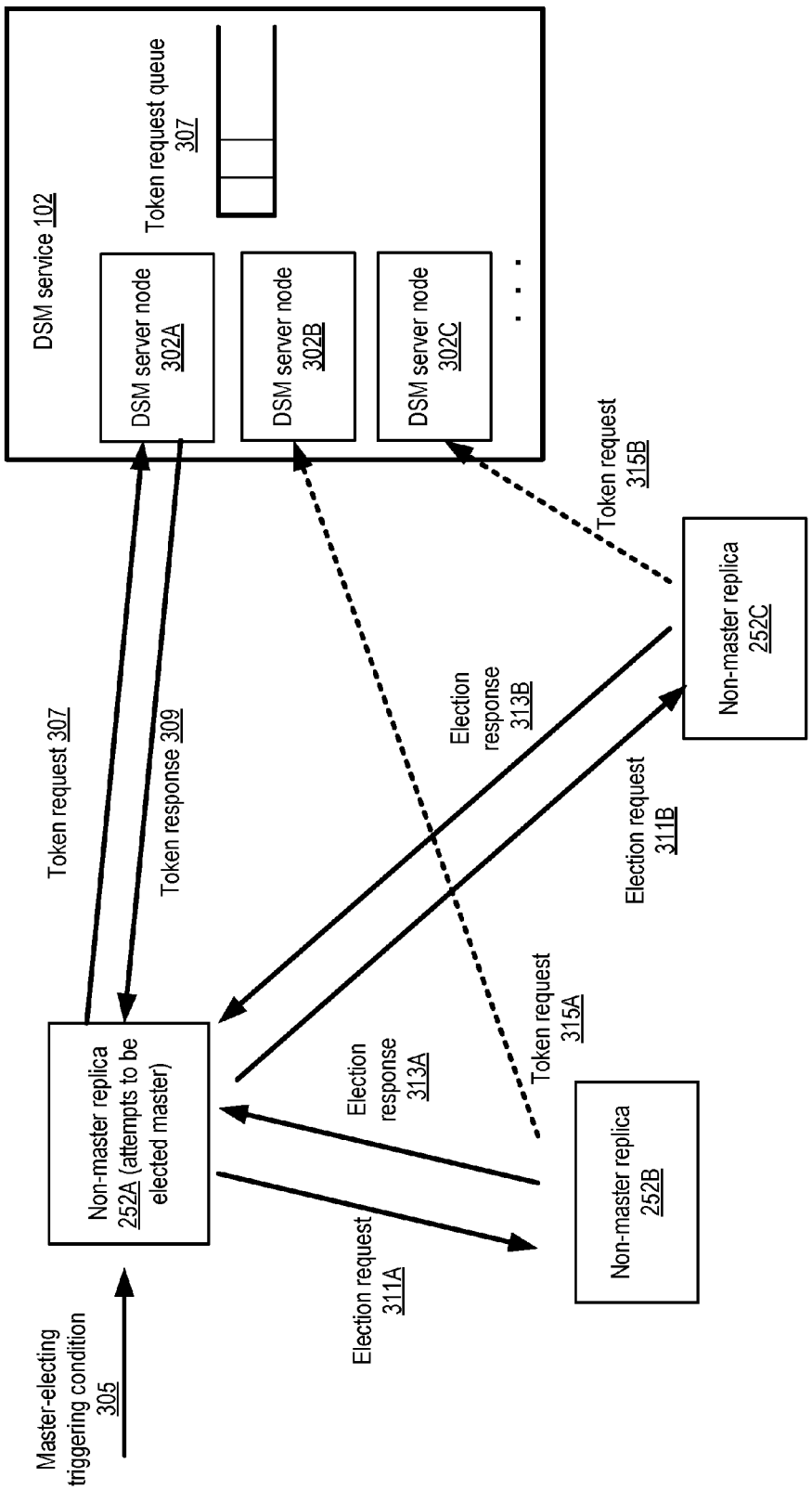
FIG. 3 illustrates an example of a sequence of operations involved in master election for a replica group, according to at least some embodiments.

FIG. 3 illustrates an example of a sequence of operations involved in master election for a replica group, according to at least some embodiments. In the depicted embodiment, the DSM 102 may comprises a plurality of server nodes 302 (e.g., server nodes 302A, 302B, and 302C) configured to work collectively to implement state management functions, in a manner similar to that discussed below with reference to FIG. 4. A given client of the DSM service (such as a replica group member) may send requests to, and receive responses from, any of the DSM server nodes 302 in some implementations, e.g., a particular server node selected based on proximity to the client. A replica group, initially comprising three non-master replicas 252A, 252B and 252C is shown. Replica 252A may detect a triggering condition 305 for master election (e.g., a write operation request may be received at replica 252A, or a request from an RR or an administrative node to initiate the process of master election may be received at replica 252A). Replica 252A may then become a candidate for the master role, e.g., by sending a token request 307 to a DSM server node 302A of the DSM service 102. In some embodiments, the DSM may implement a number of different primitive data types for state management, such as advisory locks, tokens represented by pathnames, and the like, and a request for a particular primitive object (which may be of any of the supported primitive types) that is associated with the master role for the replica group may be sent by the candidate replica 252A. In the following discussion, the term "token" may be used interchangeably with the term "lock" to indicate that a particular type of state management primitive is requested by, and granted to, a replica interested in becoming a master. In one implementation, a token request queue 307 may be maintained for each named token object managed by the DSM server nodes, and the token request may initially be queued therein, e.g., as a result of the replica 252A invoking a "Queue_For_Token" (or "Queue_For_Lock") API. In another implementation, two different DSM primitive objects may be associated with master election: e.g., a token may be requested to start the process of master election, and a lock may be granted to the elected master once master election completed.

If there are no requests ahead of the one submitted by the replica 252A in token request queue 307, the token may be granted to replica 252A, and a token response 309 may be provided to indicate the grant in the depicted embodiment. The master candidate 252A may then submit respective election requests 311A and 311B to the remaining replicas 252B and 252C respectively, in effect asking the remaining replicas to acknowledge 252A's election as master. In at least some embodiments, when a given replica such as 252B or 252C receives an indication that a different replica such as 252A is attempting to become the master, the replica that receives the indication may also submit its own token request to the DSM (such as token request 315A or 315B to DSM server nodes 302B and 302C respectively), which may also be added to the token request queue 307. This may be done as a precautionary measure to shorten the overall time taken to elect a master, for example. If the DSM cannot grant master status to the first candidate replica (252A in this example) for some reason, or if the original master candidate 252A fails or becomes disconnected before the election protocol completes, and the DSM already has enqueued requests from other replicas, this may speed up the time taken to choose one of the other replicas as the master. In addition, it should be noted that in a distributed environment such as that shown in FIG. 3, the order in which requests and responses are received, processed and/or sent by the DSM nodes and the replicas may in general be unpredictable, so that sending multiple master candidacy requests may represent a conservative approach to completing master election as soon as possible. In the depicted embodiment, therefore, a master election may be triggered at a particular replica 252 as a result of determining that a different replica has initiated the master election protocol.

After receiving the election request from the master candidate 252A, in the depicted embodiment the other replicas 252B and 252C may each eventually respond with a respective election acknowledgement 313A and 313B, indicating their confirmation that they view 252A as the elected master. In some embodiments, only a subset of the remaining non-master replicas may be required to acknowledge the master's election for the election protocol to be considered complete. Thus, in one such embodiment, if the replica group comprises three replicas as shown in FIG. 3, the candidate 252A to whom the token is granted may require only one election acknowledgment (either from 252B or 252C) to complete the election protocol. In at least some implementations, the confirmed master 252A may send an "election complete" message to the DSM, and/or the remaining replicas 252B and 252C may send messages to the DSM confirming the completion of the master election. In some embodiments, when master election is confirmed, a lock indicating master status (i.e., a different primitive than the token used to start the election) may be granted to the master replica. Upon receiving the election completion indications, any remaining queued token requests for the token granted to the master replica 252A may be removed from token request queue 307 in some implementations. In some embodiments, messages among the replicas 252 and the DSM server nodes 302 may be transmitted and/or received in a different order than that described above during master election. In addition, although each replica 252 is shown as communicating with a different DSM server node 302, such a one-to-one mapping between replicas and DSM server nodes may not be a requirement in at least some embodiments. In some implementations, whether master election is occurring or not, the replicas 252 may each be configured to receive and respond to heartbeat messages from the DSM 102, e.g., so that the DSM can monitor the health status (as opposed to, for example, the master versus non-master status) of the replicas. In some such implementations, some of the messages related to master election may be piggybacked on (included within) the heartbeat messages, or the heartbeat messages may be piggybacked on the election-related messages.

Example DSM Implementation

Figure 4:
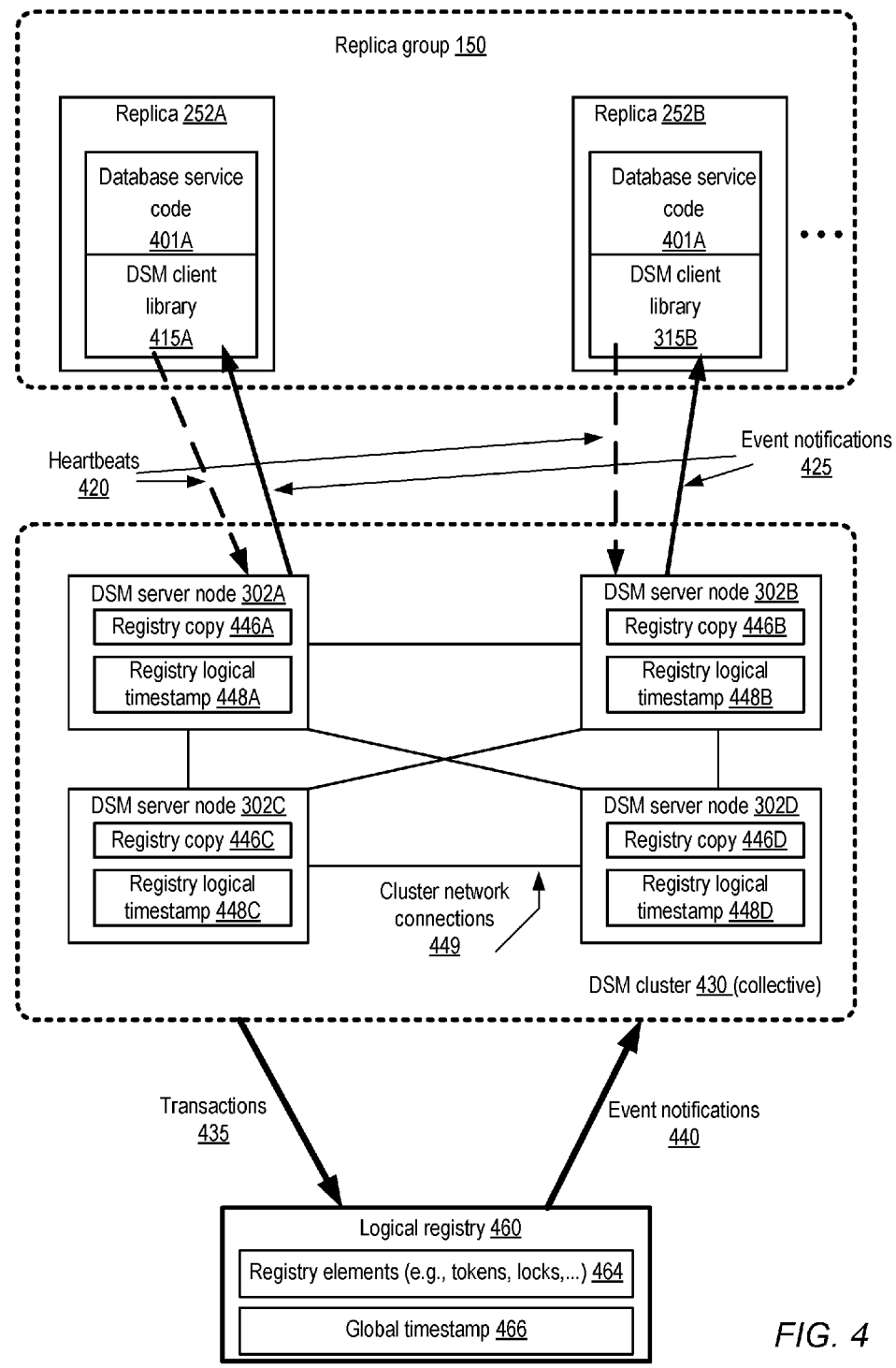
FIG. 4 illustrates an example of a distributed state manager that may be used by a distributed database, according to at least some embodiments.

In at least some embodiments, as indicated in FIG. 3 and in FIG. 1, a distributed state manager may be used to implement aspects of the master election mechanism. FIG. 4 illustrates an example of a distributed state manager that may be used by a distributed database, according to at least some embodiments. In the illustrated embodiment, the DSM comprises a server cluster 430 with a plurality of server nodes 302 (e.g., 302A, 302B, 302C and 302D). The replica group 150 may be considered a distributed client of the DSM in the illustrated embodiment, with each replica 252 comprising one or more processes, including at least one process configured to communicate with the DSM server cluster 430. In the illustrated embodiment, each replica such as 252A may comprise an execution of database service code 401A and client library components 315A. Similarly, replica 252B executes database service code 401B and client library component 415B. In general, different client processes may execute different application-level or user-level code and/or library components in some embodiments. The client library component 415 of the DSM may in some embodiments comprise a software library that exposes one or more programmatic interfaces to the database service code for interacting with the DSM server cluster 430. In various embodiments, database service 401 of a replica 252 may invoke various methods of the client library component 415 to interact with the DSM server cluster 430 over a network (e.g., to request tokens or locks), access different constants and/or variables of client library components 415, and/or otherwise access data and functionality of the client library components 415. In some embodiments, the client library components may read data from the DSM, update data in the DSM, and/or listen for events notifications 425 from the DSM.

In some embodiments, each node 302 of the DSM server cluster 330 may be implemented using a different physical cluster and/or virtual machine. In other embodiments, two or more of nodes 302 may be different software instances or processes executing on the same physical or virtual machine. The set of server nodes 302 may be referred to as a "collective" in some embodiments.

A given client process of the DSM (e.g., a process implementing some or the functionality of a replica 252) may communicate with the collective via one of the nodes 302 in the depicted embodiment. Different clients may communicate with different nodes in some embodiments. The particular node 302 chosen by a client may depend on the identity of the client, the type of request, and/or other factors. In some embodiments, a client may maintain affinity to a given node 302 once communication and/or another relationship has been established. It may also be possible for a client that has established affinity with a first node 302 of the DSM collective to switch to another node at any time. This may be done arbitrarily, in response to a node failure, in response to the node becoming overloaded, in response to a scheduler component indicating that the client should switch to another node, and/or in response to various other events. As shown in the illustrated embodiment, the various nodes 302 may communicate with one another via network connections 449. These network connections may be implemented using various types of networks (e.g., Myrinet, Ethernet, Gigabit Ethernet, etc.) in various topologies (e.g., ring, grid, Torus, bus, etc.).

For simplicity of explanation, many of the embodiments described herein comprise a DSM implemented on a fully-connected cluster of computers, where each node 302 is a different physical machine in the cluster, executes a separate instance of the DSM node software, and can communicate directly with every other node 302 in the collective via a network connection. However, those skilled in the art will appreciate that various other configurations are possible using different physical and/or virtual machines, connected by different network types and/or topologies, as described above.

According to FIG. 4, nodes 302 of the collective may work together to maintain a shared state, e.g., for various clients including replica groups, in a logical registry 460. The logical registry 460 may not necessarily be implemented as a separate physical entity, but rather, as a logical entity that may be implemented across multiple nodes 302 of the DSM. For example, in the depicted embodiment, each node 302 may keep a respective local copy 446 (e.g., local registry copy 446A for node 302A, local registry copy 446B for node 302B, and so on) of the logical registry 460. Through a consensus protocol, the nodes 302 may agree on state transitions for each node to apply to its local registry copy, thereby collectively maintaining a single logical registry 460. Each node 302 may thus maintain a cached copy of the registry that is valid as of the last registry transition (i.e., update) known at the node. In some embodiments, each transition may be associated with a registry logical timestamp, such as in a monotonically increasing 64-bit integer or counter agreed upon by the collective. This timestamp may be a physical or logical time in different embodiments, and may be referred to as the "DSM time" herein. In embodiments where the DSM time is maintained as a counter, it may be incremented each time the registry is updated in some implementations, e.g., each change to the logical registry may result in a change to the DSM time, and each change in the DSM time may indicate that at least one element of the registry was updated. Each node 302 may maintain its own registry logical timestamp 448 (e.g., logical timestamp 448A for node 302A, logical timestamp 448B for node 302B, and so on), indicative of the most recent transition of the logical registry that is reflected in the local registry copy at that node. At any point in time, in some implementations, the value of the local logical registry timestamp 448 at a given node 302 may differ from the value of the local logical registry timestamp of another node; however, if and when two nodes have the same local logical registry timestamp values, the data in their respective local registry copies 446 may be identical (i.e., both local copies of the registry may be guaranteed to have applied the same set of updates). In at least some implementations, each node 302 may also maintain an independent system clock separate from the registry logical timestamps.

Logical registry 460 may include information that may be accessed in a consistent manner by a plurality of the nodes 302. In some embodiments, the logical registry 460 may include several types of primitive and compound elements and associated metadata, such as tokens, lock objects, session objects representing connections to client processes, and the like. In some embodiments, the DSM may maintain multiple logical registries. In such embodiments, each logical registry may be identified by a unique name. Different logical registries may be used to store data relevant to a corresponding client application or set of client applications in some embodiments. For example, different distributed applications may use respective logical registries separate from one another. In other embodiments, a single logical registry may include elements representing state information of a plurality of client applications. In some embodiments, each of the elements of a given registry 360 (such as tokens, locks, other data entries, and/or sessions) may be identified by a respective pathname (e.g., "/companyA/databaseB/tableC" within a namespace, e.g., each element may be identified via a string concatenated from substrings, where each substring represents a respective hierarchical component named using a directory-like naming convention, starting with a root substring (e.g., "companyA" in the case of the element with the identifier "/companyA/databaseB/tableC").

In some embodiments, at least some entries within the logical registry may include a name, value, creation time, a modification time, and/or some other timestamp. The time-related information stored in the registry 460 (such as creation time, or modification time) may be expressed using DSM time in some embodiments, and/or using system clock time in other embodiments. For example, a global timestamp value 466 based on DSM time may be stored for a token representing master status of a given replica group in at least some embodiments. The global timestamp value may indicate when the corresponding token request was received at the collective in some implementations, or when the corresponding token request was processed at the collective in other implementations. The time a token request was processed may be somewhat later than the time the request was received, depending on various factors in different implementations and/or on how busy the node(s) 302 were when the request was received. In some embodiments, a logical registry may also list named client processes and/or client sessions (e.g., representations of connections between client processes and the server cluster 430) recognized by the DSM. Such listings may also include configuration parameters for those client processes and/or sessions.

The DSM server cluster 430 may act as a mediator between the clients such as replicas 252 and one or more logical registries 460. The client may interact with a logical registry 460 by submitting transactions to the DSM server cluster 430, which may interact with the logical registry 460 on behalf of the client process. Through a read transaction, a client process may read information such as token records, locks, entries, or sessions from the logical registry 460. Using a write transaction, a client process may update information in the logical registry 460. A request for a token (such as an invocation of a Queue_For_Token or Queue_For_Lock API by a replica 252) may represent a write transaction in some implementations, as it may lead to the creation and/or storage of a corresponding token record in the logical registry, and the global timestamp 466 corresponding to the commit of the transaction may be saved in the permit record. The granting of the token or lock may also represent a write transaction in some embodiments. Similarly, in some embodiments, a token revocation or release operation may be treated as a write transaction, since it may typically involve removing a record from the logical registry.

Each transaction may have different possible outcomes. In some embodiments, these outcomes may correspond to success-write, success-read, abort, and fail. A success-write outcome may indicate that a transaction that includes at least one write operation was executed successfully and the registry has been updated. A success-read outcome may indicate that the transaction executed successfully but did not make any changes to the logical registry. An abort outcome may indicate that the transaction was aborted for some reason other than the particular contents of the transaction. In various embodiments, the DSM may abort and/or reattempt a transaction for different reasons. A fail outcome may indicate that the transaction failed, for example, because an object that was to be created already exists, the request contained a syntax error, and/or for various other reasons.

The DSM may determine the outcome of various transactions and route event notifications (e.g., as indicated by the arrows labeled 425 in FIG. 4) indicating the outcomes to interested client processes. Client processes may register to receive some or all events in some events in some embodiments, e.g., using a transactional watch mechanism that may be implemented by the DSM. The transactional watch mechanism may allow a given client process to indicate a watch target comprising one or more objects (e.g., tokens) within the registry, and to receive notifications whenever any of those objects is modified. In some implementations, a consistent cache mechanism may be implemented by the state manager (e.g., using the watch mechanism), enabling multiple client processes to maintain respective read-only caches that are updated by the state manager whenever a modification occurs to a cache data set comprising registry objects. Internally, within the cluster 430, notifications 440 corresponding to the transaction outcomes may be sent to some or all of the server nodes 302. In some embodiments, the DSM may be configured to forward all event notifications to every client by default, but to allow each client to set up various filters to indicate the types of events in which it is interested. Each event notification 425 may be labeled with a physical and/or logical timestamp from which the clients may be able to infer bounds on the age of the event in one embodiment.

As indicated above, in some embodiments clients may use transactions to read, insert, remove, and/or modify data stored in the logical registry 460. In some embodiments, a transaction may be specified using a stack-based language. Such a transaction may be specified in terms of data tokens and operations, where the data tokens are pushed directly onto a stack and the operations read their inputs from the stack and push results to the stack. After such a transaction is complete, the resulting stack may be sent to the client process.

In some embodiments, the DSM may execute a failure detection service to detect failures among different nodes 302. For example, if a given node 302 crashed or became otherwise unresponsive, the failure detection service may determine this. In some embodiments, a failure detection service may be executed across the server cluster 430 in a distributed manner. In one embodiment, the failure detection service may also determine whether particular client processes (e.g., processes of replicas 252) have become unresponsive, for example, by monitoring heartbeat messages 420 received from various client processes. In at least some embodiments, if connectivity is lost between a client process and a given DSM node, the client library component 415 of the client process may automatically attempt to establish a connection to a different node. In at least some implementations, the client process may not be aware of the identity of the node to which it is connected.

Example Interactions Between Request Routers and Replicas

Figure 5:
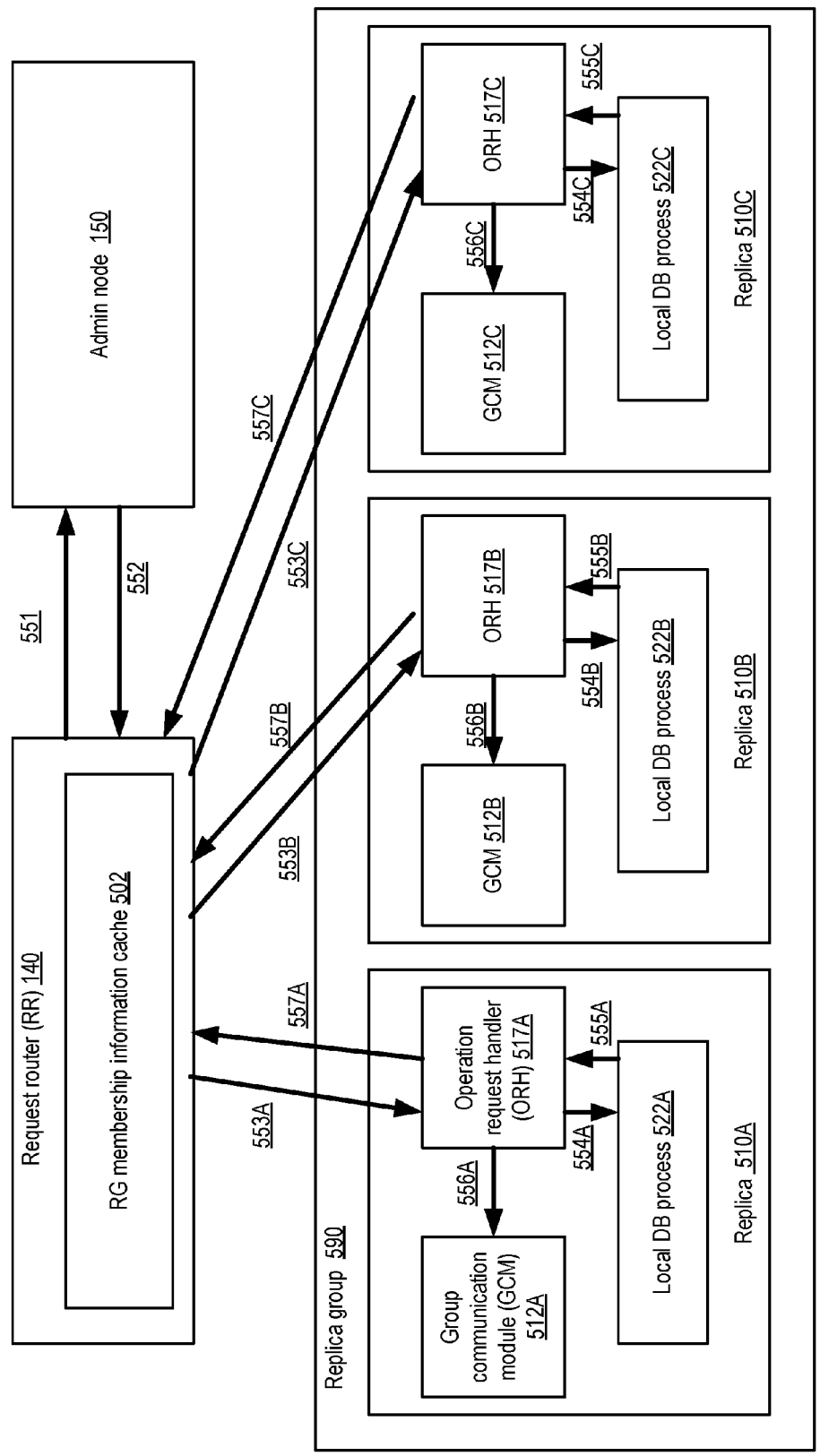
FIG. 5 illustrates example interactions between a request router node of a distributed database service and the members of a replica group in response to a client work request, according to at least some embodiments.

As noted earlier, in at least some embodiments the distributed database service may include a front-end layer comprising request router nodes 140 that receive client work requests and transmit corresponding internal requests for work operations to the appropriate replicas at storage nodes where the targeted data is located. FIG. 5 illustrates example interactions between a request router node of a distributed database service and the members of a replica group 590 in response to a client work request, according to at least some embodiments. In the illustrated embodiment, each replica 510 (e.g., 510A, 510B and 510C) comprises a respective plurality of subcomponents: an operation request handler (ORH) 517 (e.g., 517A, 517B and 517C), a group communications module (GCM) 512 (e.g., 512A, 512B and 512C), and a local database process 522 (e.g., 522A, 522B and 522C). In some embodiments, the subcomponents may each be implemented as a separate process or thread of execution, for example. The ORH 517 at a replica 510 may be configured to receive internal work operation requests (e.g., requests for writes, consistent reads, or eventually-consistent reads) from RRs, as indicated by arrows 553 (e.g., 553A, 553B and 553C), and provide corresponding responses 557 (e.g., 557A, 557B and 557C) to the RRs. If coordination with other members of the replica group 590 and/or interactions with the DSM are required, the ORH 517 at a replica may request the GCM 512 of that replica to perform the desired coordination/interactions, as indicated by arrows 556 (e.g., 556A, 556B and 556C). GCMs 512 may thus represent client processes of the DSM 102 in the depicted embodiment. Primitive operations such as local reads or writes may be implemented at the local database process 522 in response to local requests 554 (e.g., 554A, 554B and 554C) from the ORH 517, and corresponding local responses 555 (e.g., 555A, 555B and 555C) may be provided to the ORHs.

In the depicted embodiment, RR node 140 may include a cache 502 of membership information regarding various replica groups, e.g., including mappings between database table names or identifiers and network addresses and/or storage device addresses at which the replicas of the tables are located. When a work request whose implementation requires master-led coordination is received, directed to a particular database object with a corresponding replica group, the RR node 140 may first check its cache 502 to see if the cache contains an indication of a current master replica for the targeted data object. If the cache contains an entry identifying the master, the internal work request may be transmitted to that master. If, however, the cache 502 does not contain an entry for a master, the RR 140 may submit a query 551 to an administrative node 150 of the DDS, requesting information identifying the master and/or other replicas of the targeted data object. The administrative node 150 may send a query response 552, which may include the requested information. In some cases, e.g., if the replica group is known not to have a master, or if the administrative node 150 is unaware whether a master has been elected or not, the query response 552 may not identify the master replica.

If the RR 140 is unable to identify a master replica, in the depicted embodiment, the RR 140 may begin a process of contacting each of the members of the targeted replica group in some selected order, requesting the replicas in turn to perform the operation that requires master-led coordination. In effect, by submitting such requests, in at least some implementations, the RR 140 may induce each of the replicas in turn to attempt to become the master replica, until one of them succeeds. Thus, for example, if the internal operation request 553A to replica 510A requires master-led coordination at a point in time at which there is no replica designated as master, GCM 512A of replica 510A may initiate the process of master election by requesting the token associated with master status for RG 590 from the DSM. However, because replica 510A has not yet been elected master, the response 557A may indicate to the RR that replica 510A is not yet master, cannot coordinate the requested operation, and hence must reject the requested operation. The RR 140 may then submit the same request to replica 510B, in effect asking replica 510B if it can perform the master-led coordination. In turn, replica 510B's GCM 512B may send a token request to the DSM in an attempt to get 510B elected master, and the response 557B may also indicate that replica 510B is not yet the master and must reject the requested operation. Next, the RR may send the same request to replica 510C, inducing 510C in turn to attempt to become the master. If the RR cannot find a master even though it has contacted all the replicas of RG 590 at least once, the RR may again request the operation from the replicas one by one (e.g., in the same order as before), until the master election eventually completes, and one of the replicas achieves master status and sends a response 557 to the RR indicating that it can coordinate (or has already coordinated) the requested operation. After a master has been elected, the RR 140 may update cache 502 to indicate which particular replica was successful in attaining the master status in the depicted embodiment. In some implementations, the roles of the GCMs and the ORHs may be combined. In at least one implementation, some kinds of internal requests (e.g., writes, which may require communications with other replicas or with a state manager) may be sent by RRs directly to the GCMs instead of via an ORH.

Methods Associated with Conditional Master Election

Figure 6:
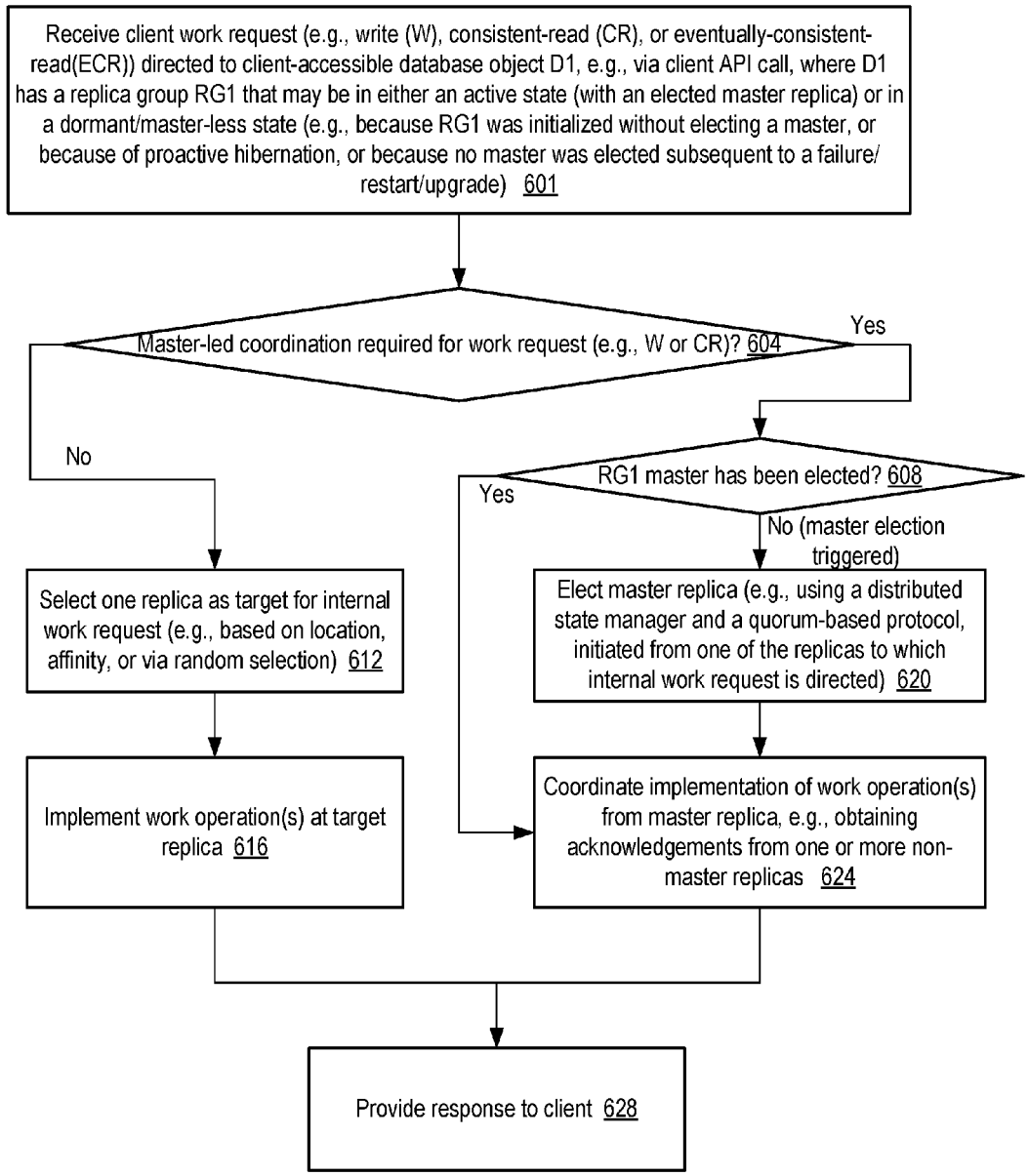
FIG. 6 is a flow diagram illustrating aspects of operations that may be performed in a distributed database in response to receiving a work request directed at a replica group, according to at least some embodiments.

FIG. 6 is a flow diagram illustrating aspects of operations that may be performed in a distributed database in response to receiving a work request directed at a replica group, according to at least some embodiments. As shown in element 601, a client work request, such as a work request directed to a particular database object D1 for a write (W), a consistent read (CR) or an eventually-consistent read (ECR) may be received, e.g., at a front-end node of a DDS 105 such as a request router 140. The replica group RG1 associated with D1, comprising a plurality of D1's replicas, may either be in an active state (with a master replica already elected) or in a dormant state (with none of the replicas designated as the master, at least as indicated by the information available to the front-end node that receives the work request). Any of several reasons may have led to a master-less or dormant state in various embodiments. For example, in some embodiments replica groups may be created or initialized without electing a master, deferring master election until the need for a master is identified by some triggering condition (such as the arrival of a work request requiring master-led coordination). In one embodiment, if a replica that was designated as a master fails, or has to be restarted for some reason such as a software upgrade or an explicit reboot request, its master status may be revoked and no new master may be elected until needed. In another embodiment, based on collected metrics such as the frequency of master-coordination-requiring operations, an active replica group may be proactively moved to dormant state (or "hibernated") by revoking the master status of the previously-elected master.

If the received work request requires master-less coordination (as detected in element 604), e.g., if it involves one or more writes or consistent reads, the front-end node may attempt to identify the master replica. If an elected master can be identified (as detected in element 608), an internal operation request corresponding to the client's work request may be transmitted to the master, and the needed operations may be coordinated from the master (element 624). Such coordination may involve one or more steps, which may depend on the specifics of the work operations—for example, the coordination may include waiting for and receiving acknowledgements of write propagation from one or more non-master replicas.

If an elected master cannot be identified (as also detected in element 608), master election may be initiated (element 620), e.g., by a replica that receives the internal request from the front-end node, in a manner similar to operations illustrated in FIG. 5 and FIG. 3. For example, a quorum-based election protocol that includes a token request being sent from the master candidate to a state manager such as a DSM 102, and election acknowledgements being received by the master candidate to which the token is granted, may be used. After the master election process completes, back-end operations may be coordinated for the work request by the elected master (element 624).

If the client's work request does not require any operations coordinated by a master replica (as also determined in element 604), in the depicted embodiment one of the replicas may be selected to implement the necessary operations (e.g., eventually-consistent read operations) (element 612). The internal request from the front-end node may be directed to the selected replica, and the operations may be performed at the selected node (element 616). In either case, i.e., whether master election was required or not, a response to the client's work request may be provided in the depicted embodiment (element 628). Thus, in the embodiment depicted in FIG. 6, the reception of a client work request that requires master-led coordination may itself serve as a triggering condition for master election (if a master has not already been elected). Work requests that do not require master-led coordination may be completed without electing a master, i.e., while the replica group remains in dormant state. Thus, depending on the types of work requests that are received and the sequences in which they are received, replica groups may remain master-less for substantial periods of time in such embodiments. Accordingly, the state manager workload associated with master election may be reduced, or at least time-shifted, compared to scenarios in which the active state is the default state for replica groups or scenarios in which masters are elected as soon as possible.

Figure 7:
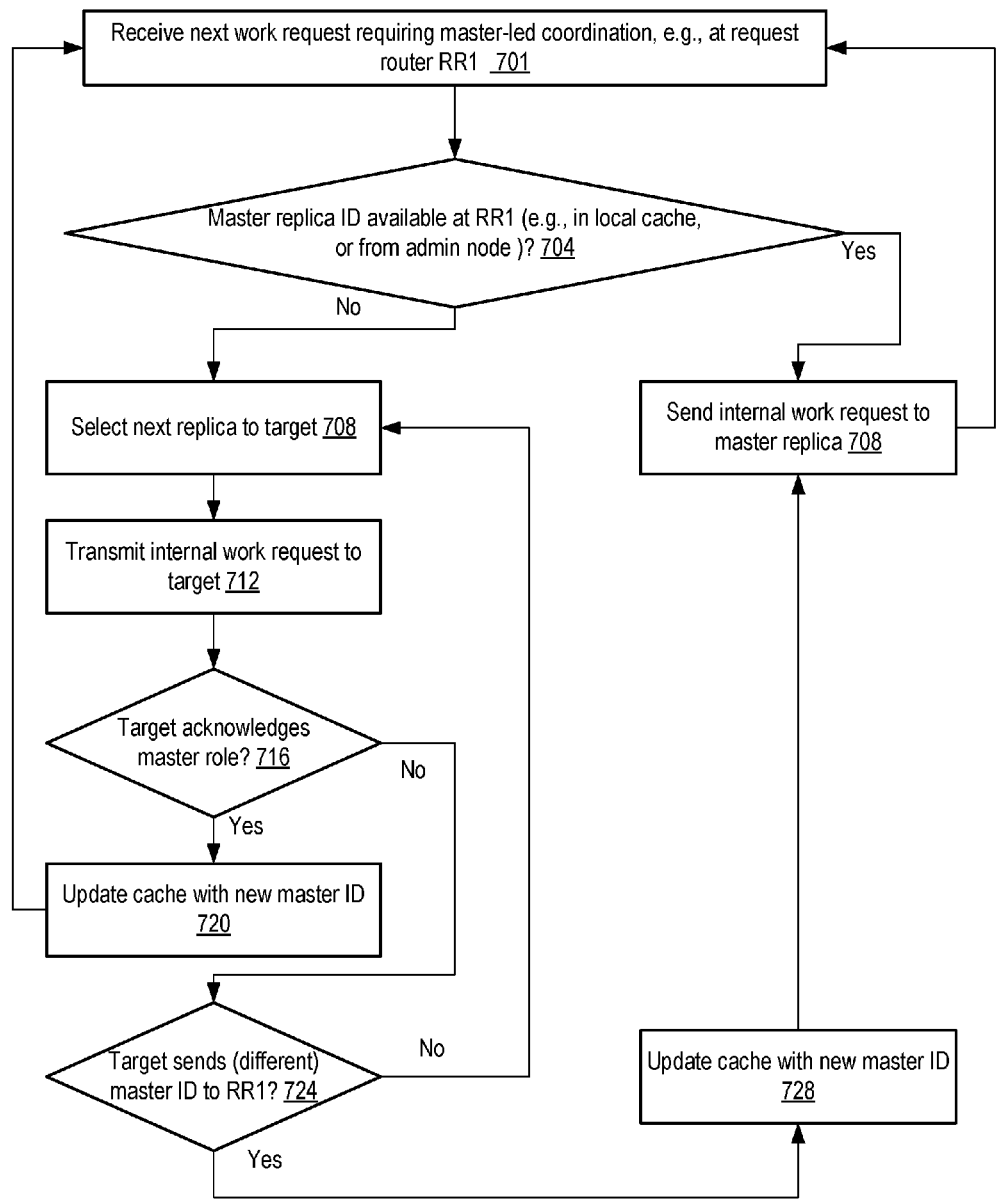
FIG. 7 is a flow diagram illustrating aspects of operations that may result in multiple replicas attempting to be elected master, according to at least some embodiments.

FIG. 7 is a flow diagram illustrating aspects of operations that may result in multiple replicas attempting to be elected master, according to at least some embodiments. As shown in element 701, a request router RR1 may receive a work request that requires master-led coordination, such as a write or a consistent read. If RR1 is able to identify the master (element 704), e.g., using a cache similar to that shown in FIG. 5, an internal work request corresponding to the client's work request may be sent to the master (element 708), and RR1 may wait for the next client work request (element 701). When the master completes the coordination of the corresponding work operations (which may be some time after the internal work request is received), an internal response message may be sent in some implementations to RR1 by the master, and a corresponding client response may be sent to the requesting client. (It is noted that workflow for the response path back to the client is not illustrated in FIG. 7.)

If RR1 is not able to identify a master (also in operations corresponding to element 704), for example because the replica group is in a dormant state or if the replica that was elected master is not responsive, RR1 may start sending an internal work request to the replica group members in order, until RR1 is eventually able to identify the master replica on the basis of a response from one of the members. As shown in element 708, the next replica to target may be selected by RR1 (e.g., based on a randomly determined order in which the replicas of the RG are to be contacted, or based on various heuristics). The internal work request may be transmitted to the selected replica (element 712). If the targeted replica acknowledges that it is the master (as determined in element 716), RR1 may update its cache with the identification of the master (element 720) and may await the next client work request (element 701). If the targeted replica does not acknowledge that it is the replica, in at least some embodiments it may be able to respond to RR1 with the correct master replica's identification information (element 724), or a hint or suggestion regarding which replica it believes to be the master. Non-master replicas that participate in master election may learn which replica has been elected as soon as the election process terminates in some embodiments, and may thus be able to inform the RRs regarding the identity of the master. If RR1 receives such a master identification, it may update its cache accordingly (element 728) and send the internal work request to the identified master (element 708). If RR1 is not provided an identification of the master (as also detected in element 724), the next target replica may be selected, and operations corresponding to elements 708 onwards may be repeated until a master is eventually found. As indicated in FIG. 5, the reception by a non-master replica of an internal work request that requires master-led coordination may serve as an incentive for that replica to attempt to become elected master, in at least some implementations. Accordingly, in such implementations, the loop of operations illustrated by elements 708 onwards may eventually lead to a master being elected, which may in turn lead to an exit from the loop.

Figure 8:
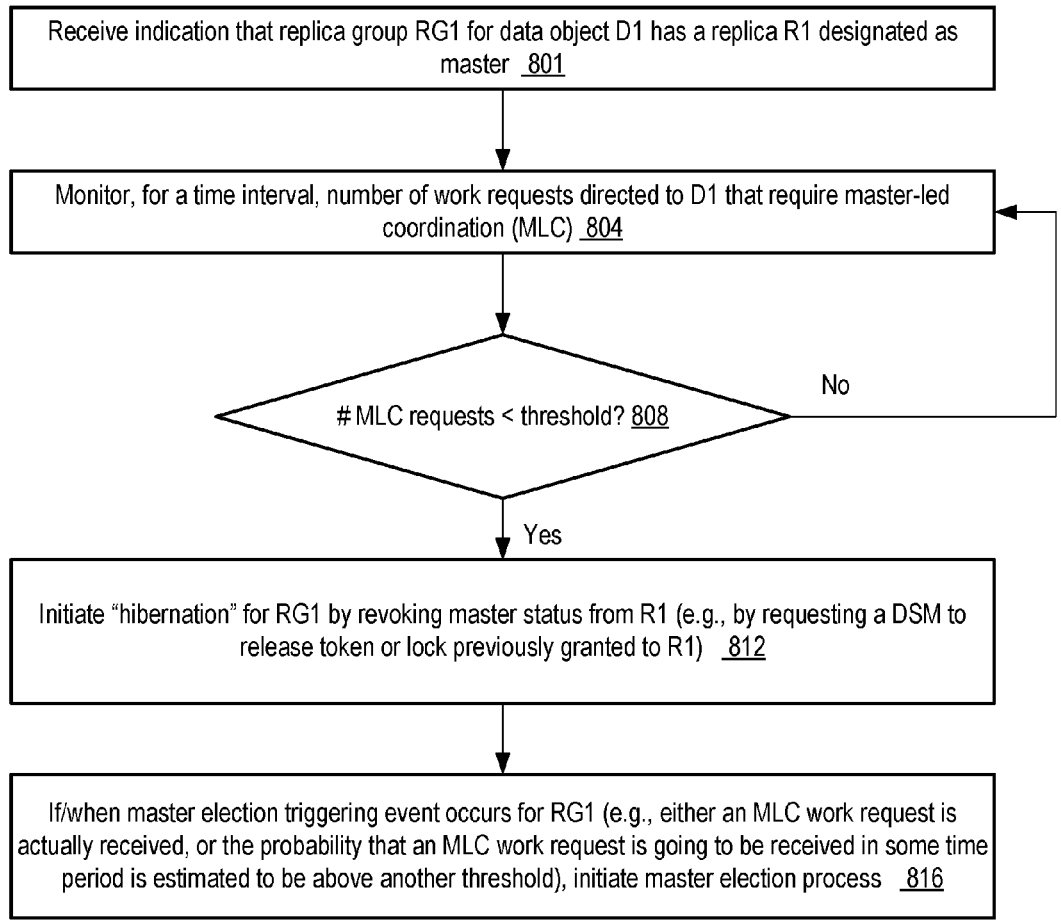
FIG. 8 is a flow diagram illustrating aspects of operations that may be performed to configure a replica-group in a dormant or master-less state, according to at least some embodiments.

FIG. 8 is a flow diagram illustrating aspects of operations that may be performed to configure a replica-group in a dormant or master-less state, according to at least some embodiments. As shown in element 801, a component of the DDS such as an administrative node 150 or an RR 140 may determine that a particular replica group RG1 of a data object D1 has a replica R1 elected or designated as the master. The number of work requests that require master-led coordination and are directed to D1 during a given time interval may be monitored (element 804).

If the number of such requests is below a threshold (as detected in element 808), e.g., if the number is very small or zero, the DDS component may determine that there is no need for RG1 to continue to have a replica designated as master. Accordingly, in the depicted embodiment, the master status of R1 may be revoked, and RG1 may be "hibernated" or moved back into master-less state (element 812). Such proactive hibernation may involve, for example, requesting the DSM 102 to revoke a token or lock associated with master status from R1 in some embodiments. Subsequently, if and when a master-election-triggering condition is detected, master election may again be initiated for RG1 (element 816). For example, master election may be triggered when a work request targeted at D1 that requires master-led coordination arrives, or if the probability that a master-led coordination-requiring work request is likely to be received within a time window is estimated to exceed a threshold. Thus, over time, a given replica group may move in and out of active state in the depicted embodiment, based on metrics and/or estimates of different types of work request arrivals.

It is noted that in various embodiments, operations other than those illustrated in the flow diagrams of FIGS. 6, 7 and 8 may be implemented to support conditional master election, and that some of the operations shown may not be implemented, or may be implemented in a different order or in parallel rather than sequentially.

Use Cases

The techniques described above, of deferring or postponing master election in a distributed database in which data objects are replicated may be useful in a variety of different scenarios. For example, for large database services that comprise tens of thousands or hundreds of thousands of tables and/or table replicas, it may be the case that a substantial number of the tables may not be accessed very frequently. If, after a large-scale outage in such an environment, masters had to be elected as soon as possible for all the replica groups for all the tables, the state management machinery that is used for master election may become overwhelmed. This may be particularly likely if the state management machinery is also used for other purposes than master election alone, e.g., for health status monitoring. In such environments, therefore, it may be advantageous to avoid electing or designating replicas until and unless the need for a master becomes apparent, or it becomes possible to predict that a master is likely to be required within a short time.

Illustrative Computer System

Figure 9:
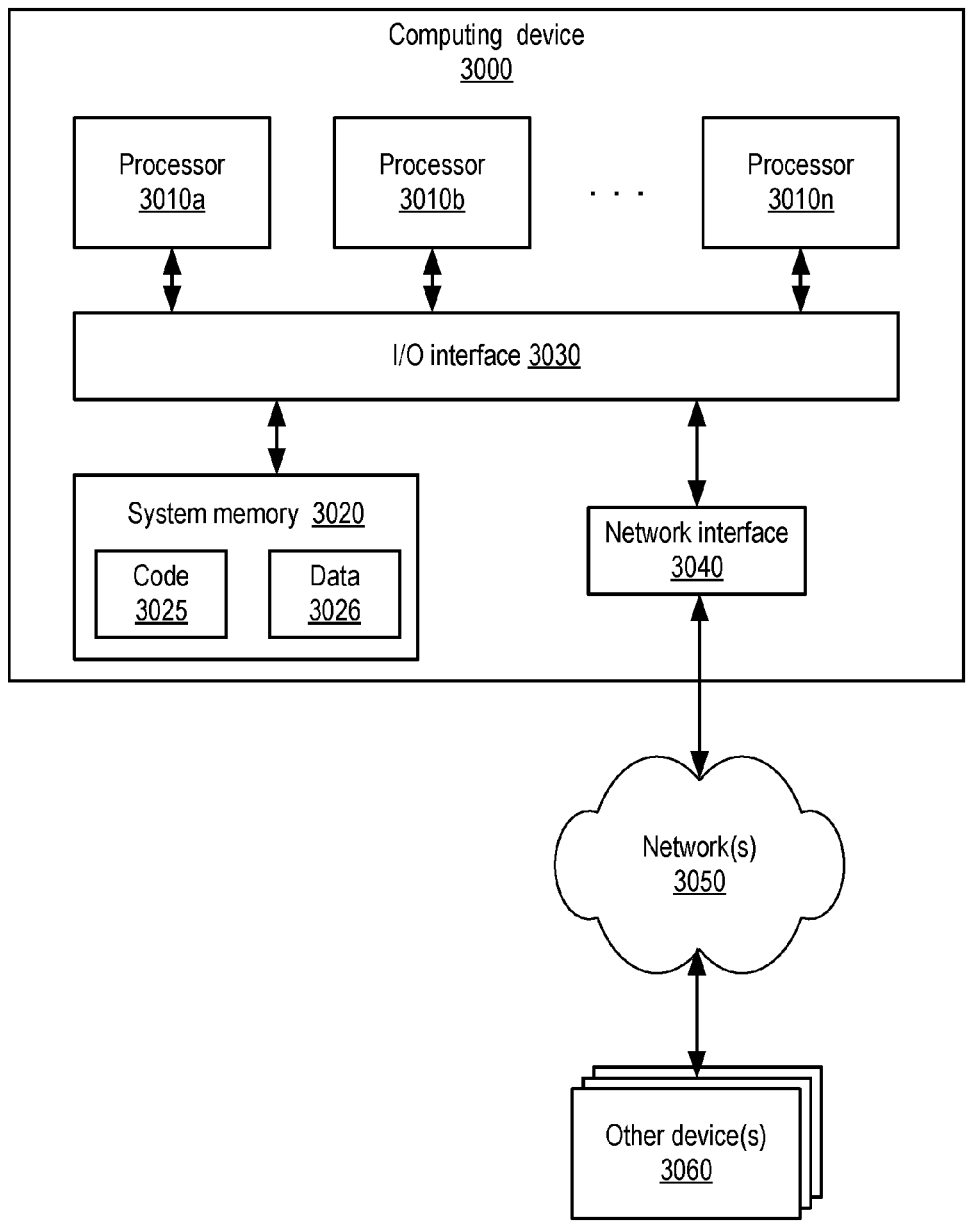
FIG. 9 is a block diagram illustrating an example computing device that may be used in at least some embodiments.

In at least some embodiments, a server that implements a portion or all of one or more of the technologies described herein, including the techniques to implement database object replicas, storage nodes, front-end nodes such as request routers, administrative nodes, or state manager nodes, may include a general-purpose computer system that includes or is configured to access one or more computer-accessible media. FIG. 9 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA. In some embodiments, graphics processing units (GPUs) may be used in addition to or instead of conventional CPUs.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces such as various types of persistent and/or volatile storage devices used to store physical replicas of data object partitions. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 8, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method, comprising:
    storing a plurality of replicas of a data at respective storage nodes of a distributed database, wherein the plurality of replicas forms a replica group that can transition between a master-less state that in which access requests are processed without coordination by an elected master replica and an active state in which access requests are processed with coordination by an elected master replica;
    responding by one or more of the replicas to a first type of access request to the data while the replicas operate in the master-less state, wherein processing of the first type of access request does not require any master replica;
    receiving a second type of access request to the data and determining that processing of the second type of access request requires at least one master replica; and
    responsive to the determination that the second type of access request requires at least one master replica, transitioning the replica group to the active state, wherein the transitioning includes initiating a master election to elect at least one of the replicas to act as a master replica to process the second type of access request.

2. The method of claim 1, wherein receiving a second type of access request comprises receiving a write request or a consistent-read request to the data.

3. The method of claim 1, wherein responding to a first type of access request comprises responding to an eventually-consistent read request to the data.

4. The method of claim 1, further comprising electing the master replica, the election comprising:
    requesting, by a given replica, a token from a state manager;
    granting, by the state manager, the token to the given replica;
    providing an indication that the token has been received by the given replica; and
    receiving an acknowledgment from at least one other replica that the given replica has been elected as the master replica.

5. The method of claim 4, wherein the second type of access request is a write request, further comprising:
    performing, by the master replica:
        propagating the write request to a non-master replica of the plurality of replicas; and
        receiving an acknowledgment from the non-master replica that the write request has been completed by the non-master replica.

6. The method of claim 4, wherein the second type of access request is a consistent-read request, further comprising:
    receiving, by the master replica, an acknowledgment from a non-master replica that a most recent write request that has been completed at the master replica has also been completed by the non-master replica.

7. The method of claim 1, further comprising moving the replicas back to the master-less state, based on a probability that an access request of the second type will be received during a time window.

8. The method of claim 1, further comprising moving the replicas back to the master-less state, based on a determination that no access requests of the second type have been received during a time interval.

9. A non-transitory computer-accessible storage medium storing program instructions that when executed on one or more processors cause the one or more processors to:
    store a plurality of replicas of a data at respective storage nodes of a distributed database, wherein the plurality of replicas forms a replica group that can transition between a master-less state that in which access requests are processed without coordination by an elected master replica and an active state in which access requests are processed with coordination by an elected master replica;
    respond by one or more of the replicas to a first type of access request to the data while the replicas operate in the master-less state, wherein processing of the first type of access request does not require any master replica;
    receive a second type of access request to the data and determine that processing of the second type of access request requires at least one master replica; and
    responsive to the determination that the second type of access request requires at least one master replica, transition the replica group to the active state, wherein the transition includes initiating a master election for at least one of the replicas to act as a master replica to process the second type of access request.

10. The non-transitory computer-accessible storage medium of claim 9, wherein to receive a second type of access request, the program instructions when executed on the one or more processors cause the one or more processors to receive a write request or a consistent-read request to the data.

11. The non-transitory computer-accessible storage medium of claim 9, wherein to respond to a first type of access request, the program instructions when executed on the one or more processors cause the one or more processors to respond to an eventually-consistent-read request to the data.

12. The non-transitory computer-accessible storage medium of claim 9, wherein the program instructions when executed on the one or more processors cause the one or more processors to electing the master replica, the election comprising:
    requesting, by a given one replica, a token from a state manager;
    receiving, by the given replica, the token;
    providing an indication that the token has been received by the given replica; and
    receiving an acknowledgment from at least one other replica that the given replica has been elected as the master replica.

13. The non-transitory computer-accessible storage medium of claim 12, wherein the second type of access request is a write request, and the program instructions when executed on the one or more processors cause the one or more processors to:
    propagate, by the master replica, the write request to a non-master replica of the plurality of replicas; and
    receive, by the master replica, an acknowledgment from the non-master replica that the write request has been completed by the non-master replica.

14. The non-transitory computer-accessible storage medium of claim 12, wherein the second type of access request is a consistent-read request, and the program instructions when executed on the one or more processors cause the one or more processors to:

receive, by the master replica, an acknowledgment from a non-master replica that a most recent write request that has been completed at the master replica has also been completed by the non-master replica.

15. The non-transitory computer-accessible storage medium of claim 9, wherein the program instructions when executed on the one or more processors cause the one or more processors to move the replicas back to the master-less state, based on a probability that an access request of the second type will be received during a time window.

16. The non-transitory computer-accessible storage medium of claim 9, wherein the program instructions when executed on the one or more processors cause the one or more processors to move the replicas back to the master-less state, based on a determination that no access requests of the second type have been received during a time interval.

17. A system, comprising:
one or more processors with associated memory that implement a state manager configured to grant a token to a replica responsive to a master election attempt by the replica in accordance with a master election protocol;
a plurality of processors with associated memory that implement a plurality of storage nodes configured to store data of a distributed database in replica groups, each replica group comprising replicas of a portion of the data, wherein multiple ones of the replica groups can transition between an active state in which access requests are processed with coordination by an elected master replica and a master-less state in which access requests are processed without coordination by an elected master replica; and
wherein the multiple replica groups are configured to delay master election to smooth, over time, master election attempts to the state manager upon recovery from an event in which each of the multiple replica groups lost a master replica, to initiate respective master elections at different times after the event in response to receipt of a first type of access request that requires a master replica, and to process a second type of access request that does not require any master replica while in a master-less state before the master election.

18. The system of claim 17, wherein the first type of access request comprises a write request or a consistent-read request, and the second type of access request comprises an eventually-consistent read request.

19. The system of claim 17, wherein the state manager is configured to monitor a health status of the replicas based on heartbeat messages received from the replicas.

20. The system of claim 17, wherein the state manager is configured to revoke a master status of a particular replica based on the health status of the particular replica.

* * * * *